US008565214B2

(12) United States Patent
Guo et al.

(10) Patent No.: US 8,565,214 B2
(45) Date of Patent: Oct. 22, 2013

(54) METHOD FOR SCHEDULING DATA TRANSMISSION IN HYBRID COMMUNICATION NETWORKS FOR TRANSPORTATION SAFETY SYSTEMS

(75) Inventors: Jianlin Guo, Newton, MA (US);
Raymond Yim, Cambridge, MA (US);
Jinyun Zhang, Cambridge, MA (US);
Philip V. Orlik, Cambridge, MA (US);
Chunjie Duan, Brookline, MA (US);
Frederick J Igo, Jr., Ayer, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 484 days.

(21) Appl. No.: 12/979,777

(22) Filed: Dec. 28, 2010

(65) Prior Publication Data

US 2012/0147879 A1     Jun. 14, 2012

Related U.S. Application Data

(63) Continuation-in-part of application No. 12/964,283, filed on Dec. 9, 2010.

(51) Int. Cl.
*H04W 4/00* (2009.01)

(52) U.S. Cl.
USPC ........................................................ 370/350

(58) Field of Classification Search
USPC .................... 370/230, 338, 328, 350, 395.43;
701/19; 342/357.09
See application file for complete search history.

(56) References Cited

U.S. PATENT DOCUMENTS

| | | | | |
|---|---|---|---|---|
| 6,665,307 | B1 * | 12/2003 | Rydnell et al. | 370/437 |
| 2010/0117898 | A1 * | 5/2010 | Wigren | 342/357.09 |
| 2011/0116451 | A1 * | 5/2011 | Xu | 370/328 |
| 2011/0238242 | A1 * | 9/2011 | Nichter | 701/19 |

OTHER PUBLICATIONS

Matheus K et al.: "Wireless Technology in Industrial Networks," Proceedings of the IEEE, New York, US vol. 93, No. 6, Jun. 1, 2005.
Matheus K et al. : "Wireless Technology in Industrial Networks, " Proceedongs of the IEEE New York, US vol. 93, No. 6, June 1, 2005.

* cited by examiner

*Primary Examiner* — Kwang B Yao
*Assistant Examiner* — Syed M Bokhari
(74) *Attorney, Agent, or Firm* — Dirk Brinkman; Gene Vinokur

(57) ABSTRACT

A hybrid communication network for a transportation safety system includes a fixed wired nodes and mobile wireless nodes. Because the wired nodes operate independently packets transmitted by the wired nodes to the wireless nodes need to be synchronized. A downlink travel time for downlink packets traveling from a controller to the wireless nodes is determined. Then, the controller schedules downlink data intervals (DDI) based on the downlink travel time; and transmits downlink packets to the wireless nodes during the DDI, such that a latency requirement of the transportation safety system is satisfied.

21 Claims, 10 Drawing Sheets

100

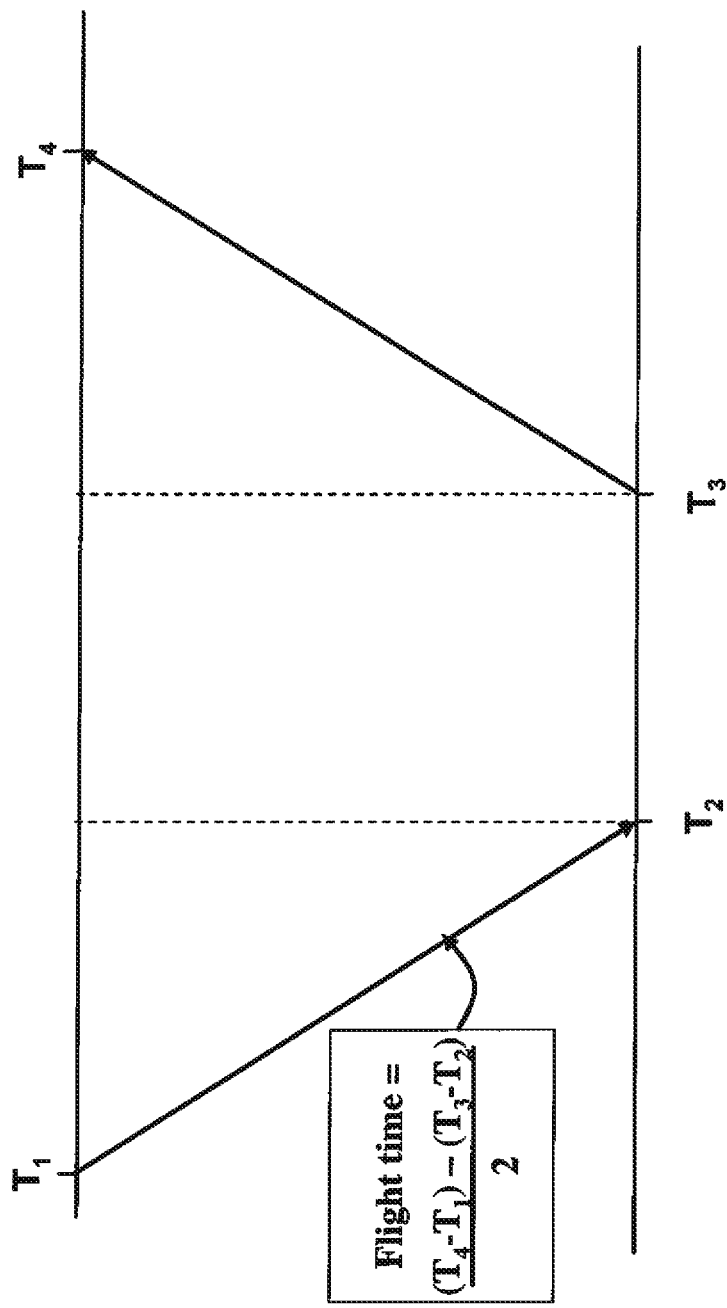

METHOD FOR SCHEDULING DATA TRANSMISSION IN HYBRID COMMUNICATION NETWORKS FOR TRANSPORTATION SAFETY SYSTEMS

RELATED APPLICATION

This U.S. Patent Application is a Continuation-in-Part of U.S. patent application Ser. No. 12/964,283, "Synchronous Data Transmission in Hybrid Communication Networks for Transportation Safety Systems," filed Dec. 9, 2010 by Guo et al., incorporated herein by reference.

FIELD OF THE INVENTION

This invention relates generally to communication networks for transportation safety systems, and more particularly to scheduling transmission of data packets in hybrid communication networks including wired fixed nodes and wireless mobile nodes.

BACKGROUND OF THE INVENTION

Data communications in transportation safety systems require high reliability and low latency. For example, the International Electronic Commission (IEC) has set stringent safety and reliability requirements on communication networks in elevator systems. Only one error is allowed in approximately $10^{15}$ safety related packets. The latency requirement for high priority packets can be as short as a few milliseconds.

Conventional safety systems are typically implemented with nodes (transceivers) connected to a dedicated wired communication networks. For example, to send safety packets between a controller and a car in an elevator system, a heavy communication cable in an elevator shaft is connected to a moveable car.

Recently, wireless communication technologies have been applied to safety systems to reduce cost and increase scalability. Communication Based Train Control (CBTC) is an example. The communication network in safety systems usually includes multiple fixed nodes such as trackside nodes for CBTC systems, and multiple mobile nodes arranged in train cars. The fixed nodes are connected by a wired network such as Ethernet. Fixed nodes are also capable of transmitting and receiving (transceiving) data wirelessly.

A controller for the safety system is typically connected to at least one fixed node via a wired interface. Packets are transmitted from the controller to a fixed node via the wired interface, and relayed hop-by-hop to all other fixed nodes via the wired network. Then, the fixed nodes retransmit the packet to the mobile nodes using the wireless network. Mobile nodes communicate packets via the wireless network to the fixed nodes. Fixed nodes receive the data, and then relay the data to the fixed node connected to the controller via the wired network. The fixed node connected to the controller then transmits data to the controller via the wired interface.

However, the specifications of existing CBTC systems are insufficient in some aspects. The latency is in the order of seconds due to the use of a conventional Carrier Sense Multiple Access (CSMA) for the wireless network, and the handover process at mobile nodes. Additionally, message error rates can be as high as $10^{-8}$.

Therefore, it is desired to develop a communication network for safety systems that achieves higher reliability, such as a message error rate of $10^{-15}$, and a latency of a few milliseconds.

SUMMARY OF THE INVENTION

Embodiments of the invention provide scheduling methods for data transmission in a multihop hybrid communication networks to enable high reliability and low latency for transportation safety systems.

BRIEF DESCRIPTION OF THE DRAWINGS

FIG. 2 is a schematic of flight time according to embodiments of the invention;

DETAILED DESCRIPTION OF THE PREFERRED EMBODIMENT

Figure 1A:
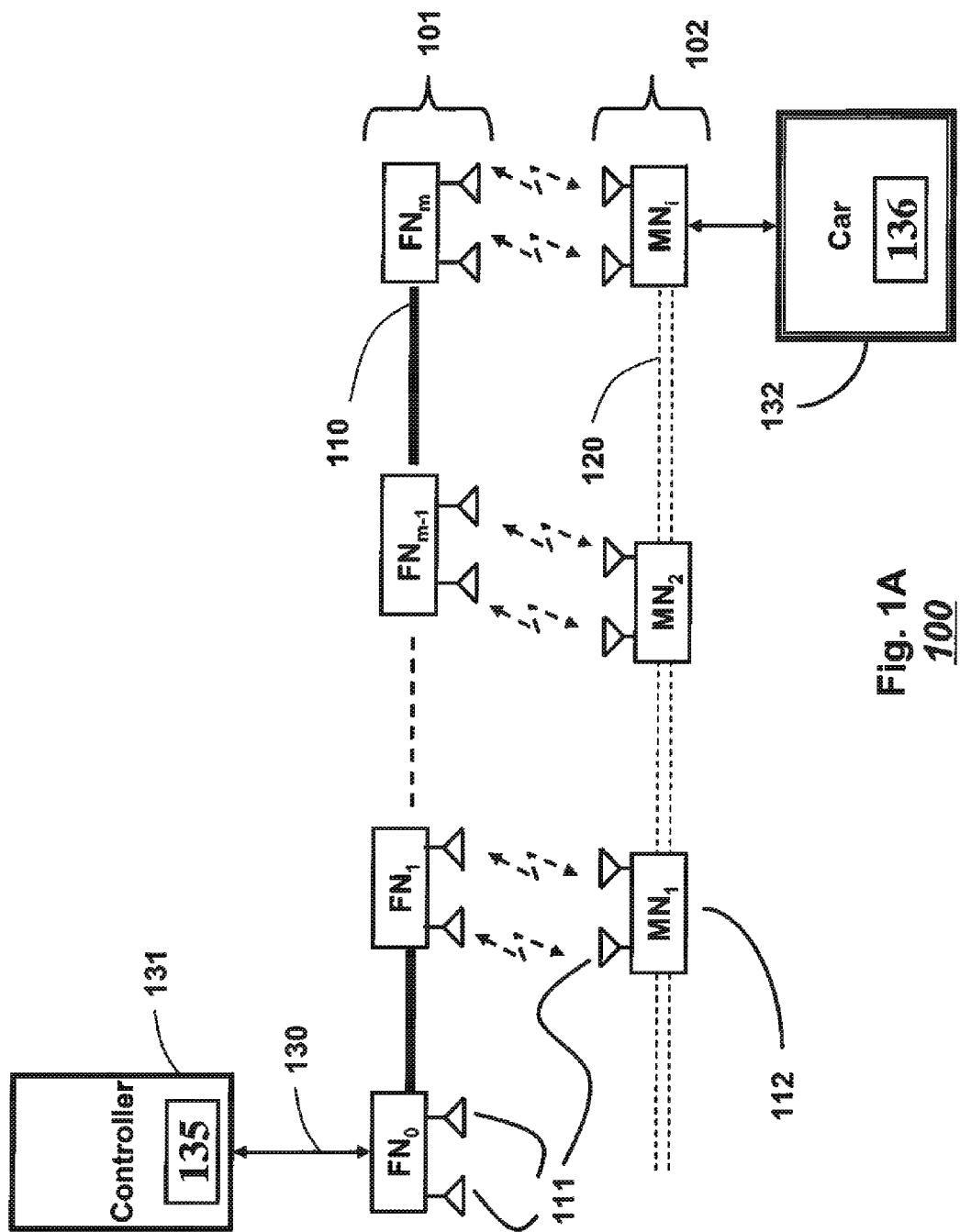
FIG. 1A is a schematic of a multihop hybrid wireless communication network for safety systems according to embodiments of the invention.

As shown in FIG. 1A, a multihop hybrid communication network 100 includes a wired network 101 and a wireless network 102. The hybrid network can be used for high reliability and low latency communication. The wired network includes a set of m+1 fixed nodes $FN_0, FN_1, FN_2, \ldots, FN_m$. The nodes are arranged in a sequential order so that a previous fixed node with a lower index is followed by a next fixed node with a higher index. That is, the nodes sequentially transmit and receive packets in time.

Each fixed node (FN) is equipped with at least two communication interfaces, one to a wired network 110, and one or more wireless transceivers 111. The wireless network 102 includes a set of mobile nodes $MN_1, MN_2, \ldots, MN_i$. Each mobile node $(MN_i)$ 112 is also equipped with one or more wireless transceivers 111. Each mobile node $MN_i$ represents a mobile device such as an elevator or train car 132.

All fixed nodes are arranged along trajectory 120, such as for an elevator car 132 moving in a shaft, or a car moving on a train track. The FNs are arranged linearly, although not necessarily a straight line. All FNs are connected via the wired backbone, such as fiber optic cable. MNs generally move along the trajectory. The underlying physical layer protocol used on the wired network is arbitrary.

Sources and sinks of data in the network include a controller 131, such as elevator controller or train controller, and mobile devices such as an elevator or train car 132. Therefore, it can also be said that controller and mobile nodes are data sources and sinks. The safety related data are transmitted as packets.

The controller is connected to the FNs via a wired interface 130, not necessarily the same as the wired backbone. In the preferred embodiment, it is assumed that the controller is connected to the FN at a first end of the linearly arranged network, e.g., $FN_0$. If the controller is connected to the FN located elsewhere, then it is possible to partition the wired network into two sub-networks so that the controller is connected to the FNs located at the end of each respective sub-networks.

The FNs can be classified into three types of nodes. The FN that is connected to the controller 131 is called a head node. The head node $FN_0$ is the only fixed node that transmits data to and receives data from the controller. The FN that is located at the second end of the network is called a terminal node $FN_m$. All remaining FNs form a set of (one or more) relay nodes that pass packets to adjacent FNs using wired backbone.

The FNs also communicates with the MNs wirelessly. Packets 135 generated in the controller and transmitted to MNs via FNs are called downlink packets. Packets 136 generated by cars and transmitted from the MNs to the controller via FNs are called uplink packets.

Synchronous transmission of fixed nodes in an asynchronous network is described in U.S. Ser. No. 12/964,283. This invention provides scheduling methods for downlink and uplink packet transmission to improve reliability and reduce latency of packet containing high priority data, such as control signals.

Downlink Packet Transmission

The controller transmits a downlink packet 135 to the head node $FN_0$ via the wired interface.

The packet is asynchronously relayed sequentially to all the fixed nodes via the wired network 101.

All fixed nodes the transmit packet synchronously to the mobile nodes wirelessly via the wireless network 102.

Uplink Packet Transmission

The mobile node transmits the packet wirelessly to the fixed nodes within transmission range of the mobile node.

The fixed nodes that receive the packet successfully relay the packet to the head node via the wired network.

The head node transmits the packet to the controller via the wired interface.

Functionality of Scheduling Methods

In the multihop hybrid wireless communication network 100, scheduling method for downlink and uplink data packet transmission includes the following: scheduling downlink data intervals (DDI) and uplink data intervals (UDI) for controller and mobile nodes, and scheduling multiple data packets for transmission within a downlink data interval, or an uplink data interval.

Packet Travel Time

The scheduling methods depend on a travel time for the packet, which is determined as follows. In the multihop hybrid wireless communication network 100, packet transmission is different from that in a conventional peer-to-peer network. The packet is relayed between the controller and the mobile nodes by fixed nodes. Each relay has an inherent latency. For safety systems, the safety signal in the packet must be delivered to the destination within a specific time period. That is, high priority packet transmission must meet a latency requirement. Any delay is unacceptable. Therefore, to schedule packet transmission without violating the latency requirement, the data source determines the time it takes for the packet to travel from the source to the sink.

Figure 1B:
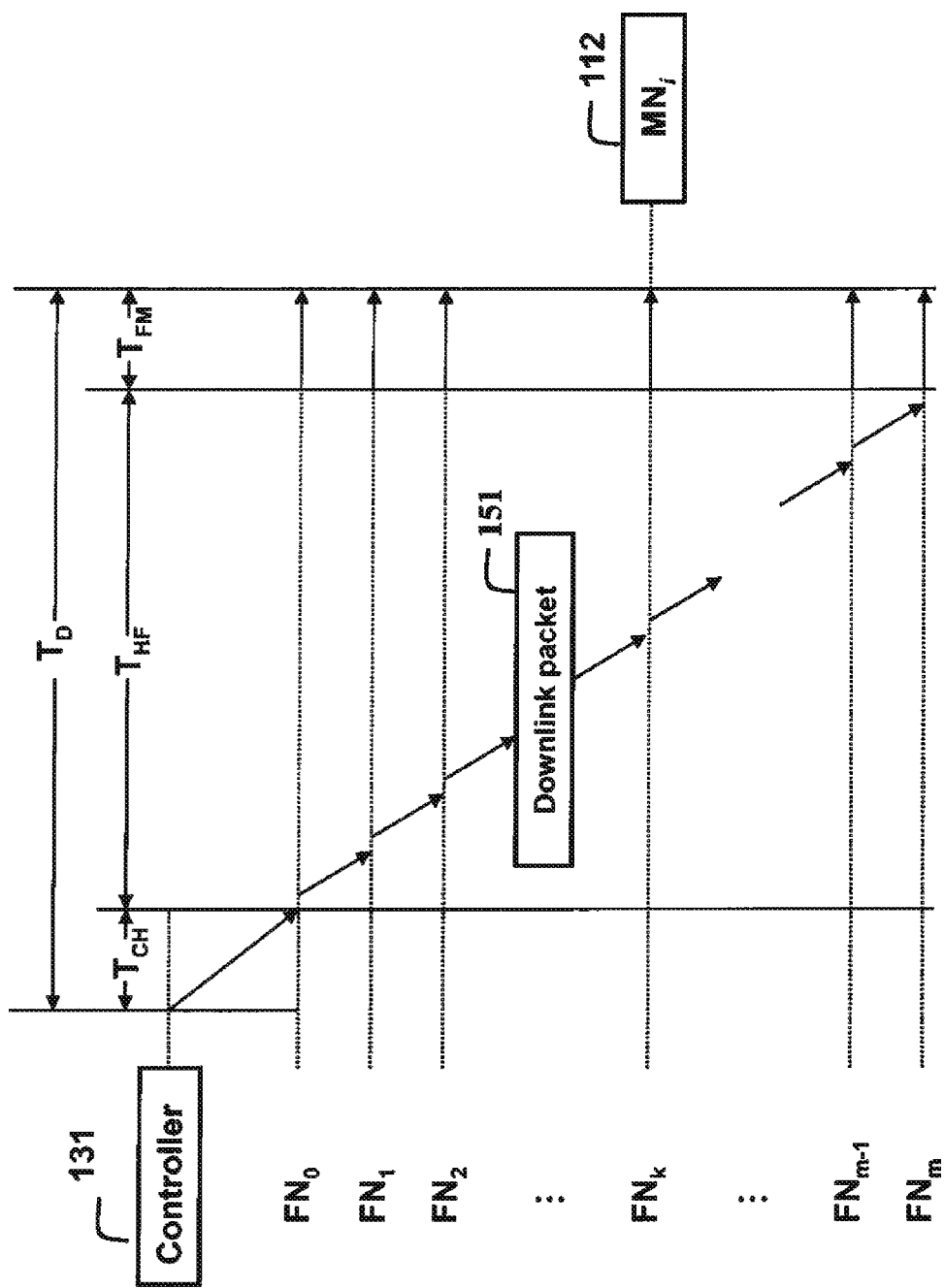
FIG. 1B is a schematic of travel time of a downlink packet transmitted from a fixed controller to a mobile node according to embodiments of the invention.

As shown in FIG. 1B, the downlink travel time $T_D$ for a downlink packet 151 from the controller 131 to the mobile node $MN_i$ 112 is $$T_D = T_{CH} + T_{HF} + T_{FM}. \quad (1)$$

I. $T_{CH}$ is the time from when the controller begins transmitting the packet to the time the head node ($FN_0$) has received the packet.

II. $T_{HF}$ is the time from when the head node has received the packet to the time when all the fixed nodes begin transmitting packet synchronously.

III. $T_{FM}$ is the time from when all the fixed nodes synchronously transmit the packet to the time when the mobile node $MN_i$ has received the packet.

The determination of $T_{HF}$ is described in U.S. Ser. No. 12/964,283. $T_{CH}$ and $T_{FW}$ can be determined using round trip packet transmission flight time as shown in FIG. 2, see U.S. Ser. No. 12/964,283.

Figure 1C:
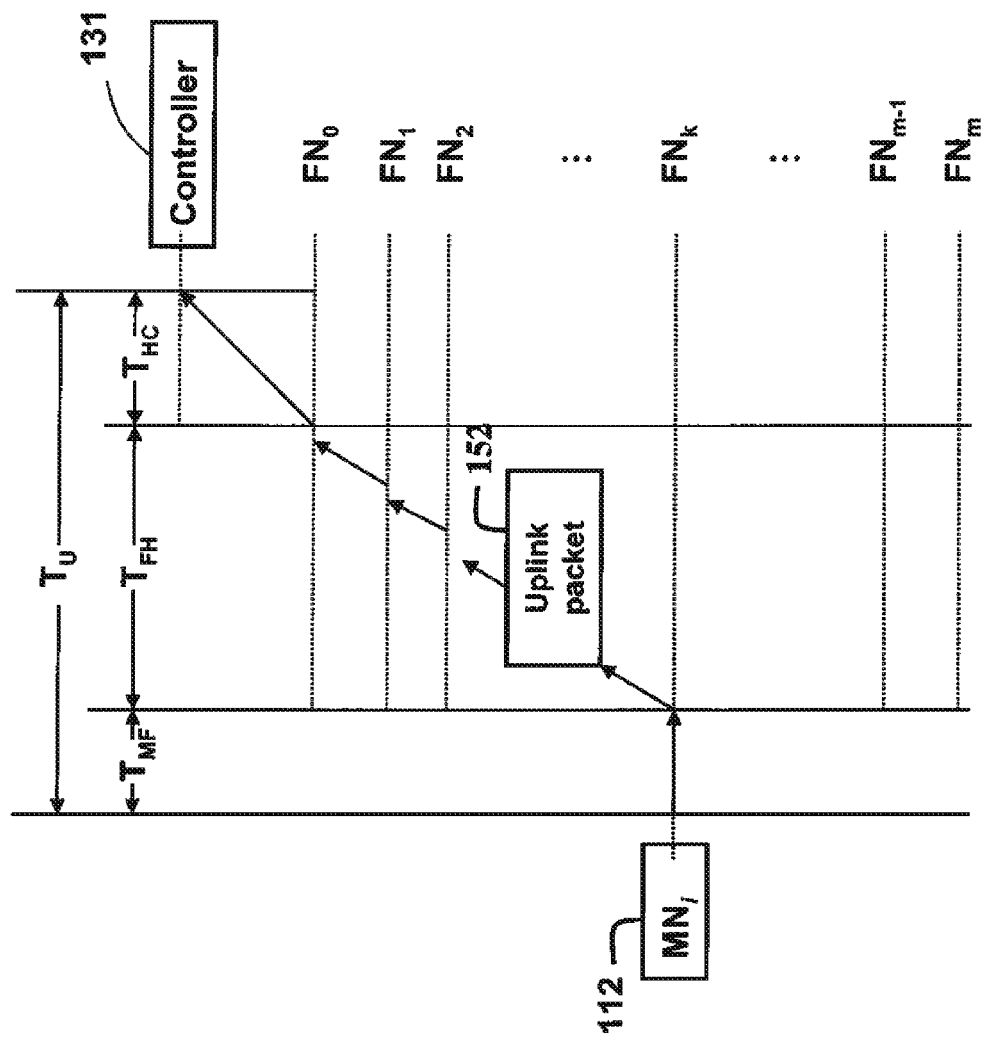
FIG. 1C is a schematic of travel time of an uplink packet transmitted from the mobile node to the controller according to embodiments of the invention.

FIG. 1C shows the uplink travel time $T_U$ of an uplink packet 152. The travel time $T_U$ is $$T_U = T_{MF} + T_{FH} + T_{HC}. \quad (2)$$

I. $T_{MF}$ is time from when the mobile node $MN_i$ begins transmitting the packet wirelessly to the time the fixed nodes have received the packet.

II. $T_{FH}$ is time from when the fixed nodes have received the packet to the time when the head node begins transmitting the packet to the controller.

III. $T_{HC}$ is the time from when the head node starts transmitting the packet to the controller to the time when the controller has received the packet.

Due to the symmetry of transmission, $T_{MF} = T_{FM}$ and $T_{HC} = T_{CH}$ as long as the length of the uplink packet equals to the length of the downlink packet. However, $T_{FH}$ can be smaller than $T_{HF}$ even if the lengths of the downlink and uplink packets are identical. For the uplink packet, $T_{FH}$ depends in part on the location of the mobile node 112. $T_{FH}$ is smaller when the mobile node is near the head node, and $T_{FH}$ is larger when the mobile node is near the terminal node. $T_{FH} = T_{HF}$ only if the uplink relay starts from terminal node.

The travel time of the packet also depends on the length of the packet. It takes more time for longer packet and takes less time for shorter packet. To be more accurate, packets are partitioned into n different categories $C_j$ (j=1, 2, ..., n) based on the length of the packet. For each category $C_j$, the packet with the maximum length is used to determine the travel time $T_{Cj}$. The packets are partitioned such that $T_{C1} < T_{C2} < ... < T_{Cn}$. If the length of a packet falls into category $C_j$, $T_{Cj}$ is used as travel time for that packet.

For example, if the packets are partitioned into three categories with category $C_1$ including packets for which the length ranges from 1 byte to 100 bytes, category $C_2$ includes packets for which the length ranges from 101 bytes to 200 bytes, and for category $C_3$, the length of the packets ranges from 201 bytes to the maximum packet length allowed in the network 100. Then, a packet with length of 200 bytes is used to determine the packet travel time for category $C_2$. If the length of a packet is 50 bytes, then the packet travel time for category $C_1$ is used as the travel time for that packet in scheduling.

The determination of time $T_{Cj}$ (j=1, 2, ..., n) can be done before packet transmission starts. For uplink packets, $T_{Cj}$ depends on the location of mobile nodes. To be safe, the travel time is based on when the uplink relay starts from the terminal node. This guarantees a compliant travel time for all uplink packets transmitted by the mobile node at any location.

Schedule Downlink and Uplink Data Intervals

In a multihop hybrid wireless communication network according to embodiments of the invention, nodes are not synchronized. The controller and the mobile nodes do not communicate directly with each other. The packets are relayed by the fixed nodes via the wired network and then to the mobile nodes via the wireless network or to the controller via the wired interface. Data transmission time is partitioned into downlink data intervals (DDI) and uplink data intervals (UDI). The length of the DDI and the UDI can be fixed or variable. Also, the length of the DDI can be different from the length of the UDI.

Based on whether the length of the DDI and the UDI is fixed or variable, two scheduling methods are provided. Also, based on the availability of dedicated downlink and uplink channels, a third scheduling method is provided.

Schedule Fixed Length DDI and UDI

There are two ways to schedule the fixed length DDI and UDI. The controller and the mobile nodes can start their DDI and UDI at the predefined time or dynamically. The predefined time starting scheme is straightforward because the start time of DDI and UDI is predetermined. The controller and mobile nodes just transmit and receive according to the predefined DDI and UDI. The following describes dynamic DDI and UDI starting, in which the start of DDI and UDI is determined dynamically by the controller and the mobile nodes.

Figure 3:
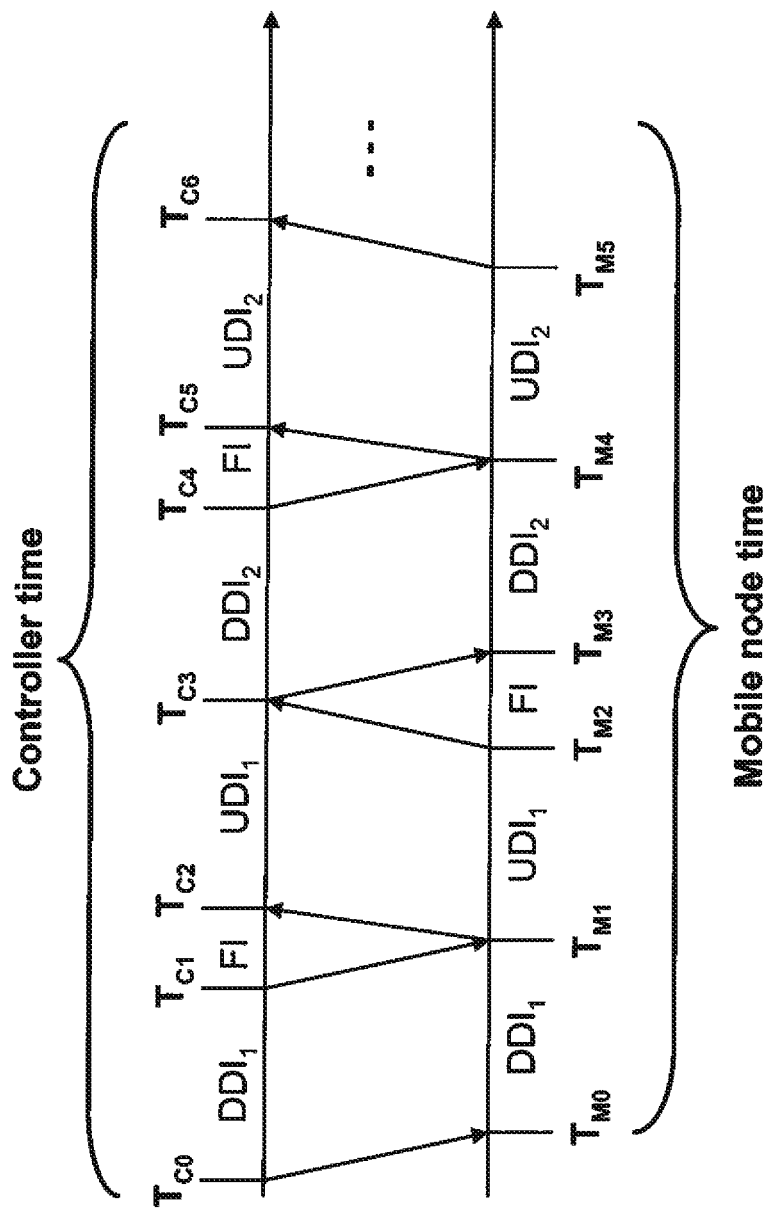
FIG. 3 is a schematic of scheduling fixed length downlink data intervals and uplink data intervals according to embodiments of the invention.

As shown in FIG. 3, the controller initiates the first $DDI_1$ at controller time $T_{C0}$ by transmitting a downlink data packet. That is, the packet transmission starts with downlink data first. The mobile nodes wait for the packet from the controller before transmitting their uplink packets. For the purpose of simplicity, the first downlink packet transmitted at the beginning of each DDI has the same length. This is only for keeping the start of DDI and UDI periodic, and this description simple. It is to be understood that the same scheduling method works for non-periodic start of DDI and UDI. That is, there is no restriction on the length of the first downlink packet.

To start the first $DDI_1$, the controller transmits a downlink data packet with specific length. If there is no data to be transmitted, the controller transmits a packet with payload padded to zero. The starting time $T_{C0}$ of the first downlink packet transmission is the beginning of the $DDI_1$ for the controller.

The mobile nodes start their $DDI_1$ when the mobile nodes receive the first downlink packet from the controller. For the mobile nodes, the starting time $T_{M0}$ of receiving the first downlink packet denotes the beginning of their $DDI_1$. Because the downlink packet is transmitted to the mobile nodes synchronously, all mobile nodes receive the first downlink packet at the same time. Therefore, mobile nodes start their $DDI_1$ at the same time.

Starting from the first packet transmission, the controller transmits downlink packets until the $DDI_1$ ends at time $T_{C1}=T_{C0}+T_{DDI}$, where $T_{DDI}$ denotes the time period length of the DDI.

Starting from receiving the first downlink packet at the time $T_{M0}$, the mobile nodes continue receiving downlink packets until to the end of their $DDI_1$ at time $T_{M1}=T_{M0}+T_{DDI}$. Then, the mobile nodes start their first $UDI_1$, and transmit the uplink packets until their $UDI_1$ ends at time $T_{M2}=T_{M0}+T_{DDI}+T_{UDI}$, where $T_{UDI}$ denotes the time period length of the UDI.

The controller can determine when the mobile nodes start their $UDI_1$ according to the controller time. The $UDI_1$ at the mobile nodes starts at time $T_{C0}+T_{CH}+T_{HF}+T_{DDI}$ and ends at time $T_{C0}+T_{CH}+T_{HF}+T_{DDI}+T_{UDI}$, where $T_{CH}$ and $T_{HF}$ are for the first downlink packet and their definitions are described in Eqn. (1). Because the travel time of the uplink packet depends on the location of the mobile node and packet length, the controller must be ready for the earliest arriving uplink packet. So controller starts its $UDI_1$ at time $T_{C2}=T_{C0}+T_{CH}+T_{HF}+T_{DDI}+T_{MF}$, where $T_{MF}$ is for a minimum length uplink packet and as defined by Eqn. (2). For the controller, its $UDI_1$ ends at time $T_{C3}=T_{C0}+2(T_{CH}+T_{HF})+T_{DDI}+T_{UDI}$.

Note that the UDI for the controller is longer than the UDI for the mobile nodes. This guarantees that the controller receives uplink packet transmitted by the mobile nodes at any location with any packet length.

When its $UDI_1$ ends at time $T_{C3}$, the controller starts its $DDI_2$ immediately by transmitting downlink packets and its $DDI_2$ ends at time $TC_4=T_{C0}+2(T_{CH}+T_{HF})+2T_{DDI}+T_{UDI}$.

The mobile nodes can also determine when to start their $DDI_2$. According to the mobile node time, the $DDI_2$ starts at time $T_{M3}=T_{M0}+2(T_{CH}+T_{HF})+T_{DDI}+T_{UDI}$ and ends at time $T_{M4}=T_{M0}+2(T_{CH}+T_{HF})+2T_{DDI}+T_{UDI}$.

This DDI and UDI pattern continues. In general for the controller, the $DDI_n$ (n=1, 2, ... ) starts at the controller time $$T_{C0}+(n-1)[2(T_{CH}+T_{HF})+T_{DDI}+T_{UDI}]$$

and ends at the controller time $$T_{C0}+(n-1)[2(T_{CH}+T_{HF})+T_{DDI}+T_{UDI}]+T_{DDI}$$

and its $UDI_n$ (n=1, 2, ... ) starts at the controller time $$T_{C0}+(2n-1)(T_{CH}+T_{HF})+nT_{DDI}+(n-1)T_{UDI}+T_{MF}$$

and ends at the controller time $$T_{C0}+n[2(T_{CH}+T_{HF})+T_{DDI}+T_{UDI}]$$

For the mobile nodes, their $DDI_n$ (n=1, 2, ... ) starts at the mobile node time $$T_{M0}+(n-1)[2(T_{CH}+T_{HF})+T_{DDI}+T_{UDI}]$$

and ends at the mobile node time $$T_{M0}+2(n-1)(T_{CH}+T_{HF})+nT_{DDI}+(n-1)T_{UDI}$$

and their $UDI_n$ (n=1, 2, ... ) starts at the mobile node time $$T_{M0}+2(n-1)(T_{CH}+T_{HF})+nT_{DDI}+(n-1)T_{UDI}$$

and ends at the mobile node time $$T_{M0}+2(n-1)(T_{CH}+T_{HF})+nT_{DDI}+nT_{UDI}$$

It is to be understood that if there is no restriction on the length of the first downlink packet transmitted in each DDI, there is no general expressions for start and end times of the DDI and UDI. The first downlink packet in $DDI_1$ determines start and end times of the $DDI_1$ and the $UDI_1$. The first downlink packet in the $DDI_2$ determines start and end times of the $DDI_2$ and the $UDI_2$. In general, the first downlink packet in the $DDI_n$ determines start and end times of the $DDI_n$ and the $UDI_n$ (n=1, 2, ... ). The calculation of start and end times for the $DDI_n$ and the $UDI_n$ is same as the calculation for the $DDI_1$ and the $UDI_1$ as described above.

As shown in FIG. 3, the DDI and the UDI for the controller and the mobile nodes are not aligned due to the packet travel time in a multihop hybrid wireless communication network. FIG. 3 also shows that there is a free interval (FI) for the controller between a DDI and next UDI. There is also a FI for the mobile nodes between a UDI and next DDI. The length of the FI can be different from that for mobile nodes and it may also vary from time to time depending on if start of DDI and UDI is periodic.

Schedule Variable Length DDI and UDI

In this embodiment, it is allowed to terminate the DDI or the UDI early if there is no more data to be transmitted within the DDI or the UDI.

DDI and UDI scheduling starts the same as for the fixed length DDI and UDI, with the default length defined for the DDI and the UDI. The DDI and the UDI can start at the predefined time, or dynamically. However, for optimizing bandwidth, the controller can terminate the DDI early if the controller does not have any packets to transmit within the DDI, and the mobile nodes can terminate the UDI early if mobile nodes do not have any packets to transmit within the UDI.

Figure 4A:
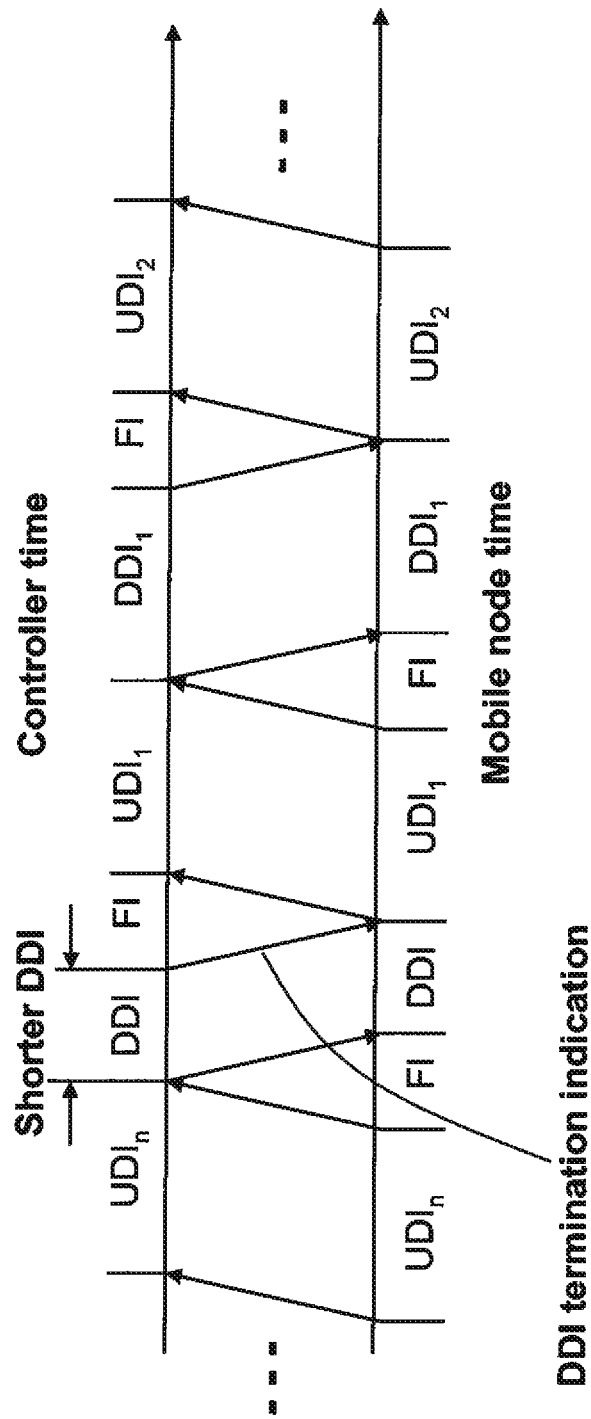
FIG. 4A is a schematic of scheduling variable length downlink data interval dynamically according to embodiments of the invention.

FIG. 4A shows DDI early termination by the controller. Following $UDI_n$, the controller starts downlink data transmission in the next DDI. Before the end of the DDI, the controller indicates the termination of current DDI in its last downlink packet transmitted to the mobile nodes.

When the mobile nodes receive this DDI termination packet, the mobile nodes terminate their DDI and start their next UDI. The controller can determine when the mobile node receives the DDI termination packet and starts their next UDI. Therefore, the controller can decide when it should start its next UDI. Starting from this $UDI_1$, the DDI and UDI pattern continues with default length for DDI and UDI until an early termination is made by either the controller or the mobile nodes.

Figure 4B:
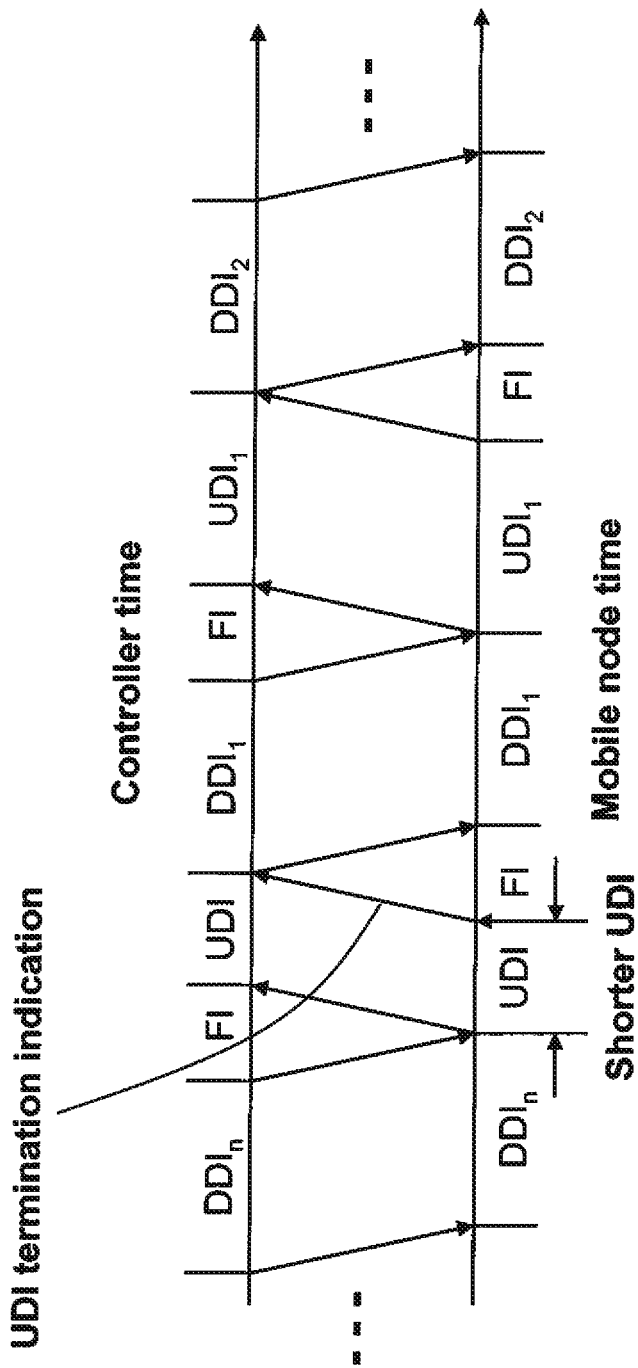
FIG. 4B is a schematic of scheduling variable length uplink data interval dynamically according to embodiments of the invention.

FIG. 4B shows early termination of the UDI with only one mobile node. When $DDI_n$ ends, the mobile node starts uplink data transmission in the next UDI. Before the end of the UDI, the mobile node indicates the termination of current UDI in its last uplink packet transmitted to the controller. When the controller receives this UDI termination packet, the controller terminates its own UDI and starts its next DDI. The mobile node starts its next DDI when it receives next downlink packet. Starting from this $DDI_1$, the DDI and the UDI pattern continues with default length for DDI and UDI until an early termination is made by either the controller or the mobile node.

If there are multiple mobile nodes, termination of the UDI is indicated by all mobile nodes. For example, there are two mobile nodes, $MN_1$ and $MN_2$. If $MN_1$ indicates a termination of UDI, then the controller does not terminate its UDI and it keeps receiving uplink packets from $MN_2$ until to the end of the current UDI. In this case, $MN_1$ does not have any uplink packet to transmit. Therefore, $MN_1$ waits for the next downlink packet from the controller to start its next DDI. However, if the controller receives the UDI termination from both $MN_1$ and $MN_2$, the controller then terminates its UDI and starts the next DDI.

Schedule DDI for Networks with Controller and Fixed Nodes Having Dedicated Downlink and Uplink Communication Channels If the wired network is equipped with dedicated downlink and uplink channels, a more efficient scheduling method is provided. In this case, the controller has a dedicated downlink channel to the head node and a dedicated uplink channel from the head node. Also, the wired network has a dedicated downlink channel and a dedicated uplink channel.

Figure 5:
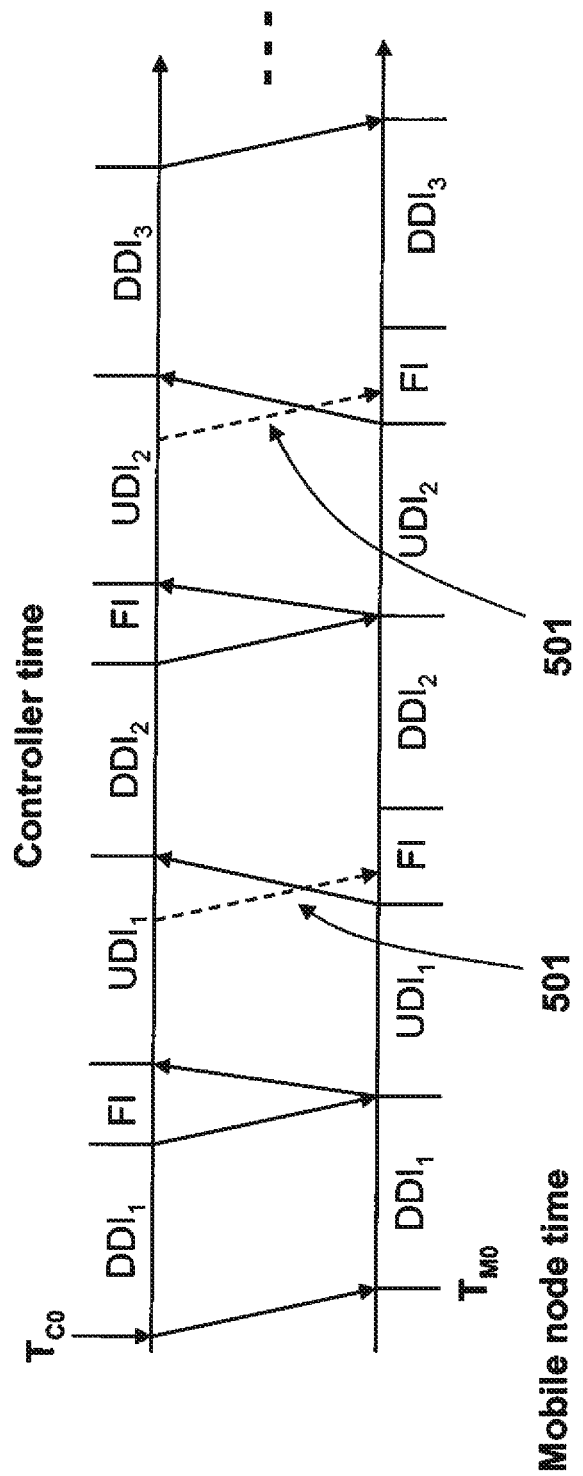
FIG. 5 is a schematic of scheduling downlink data intervals when the controller and the fixed nodes have dedicated downlink and uplink transmission channels according to embodiments of the invention.

As shown in FIG. 5, the controller can start 501 the downlink data transmission early for $DDI_2$. Precisely, the controller can start the $DDI_2$ downlink transmission at time $T_{C0}+T_{DDI}+T_{UDI}+\Delta T$, where $\Delta T$ accommodates turnaround time for all the mobile nodes. In general, the controller can start downlink transmission for $DDI_n$ at time $T_{C0}+(n-1)(T_{DDI}+T_{UDI})+\Delta T$ (n=2, 3, . . . ). This scheduling method fully utilizes the free intervals of the mobile nodes.

Schedule Multiple Data Packets for Transmission within a DDI or UDI

In most communication networks, a packet is stored in a transmission queue when the packet is generated. The packet remains in the transmission queue until the packet is transmitted. The time from packet generation to packet transmission is called the queuing time. In safety systems, there is a strict restriction on the latency for high priority packet. The high priority packet must be transmitted to satisfy a specific latency requirement. Therefore, the packet queuing time must be carefully limited.

Packet Queuing Time

The controller and the mobile nodes start relative timing when the packet is generated. For the high priority packet, such as a control signal packet, the queuing time is restricted, based on the latency requirement.

Figure 6A:
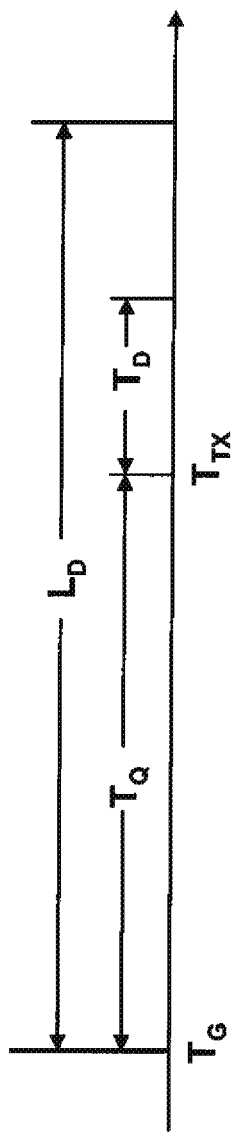
FIG. 6A is a schematic of a downlink packet queuing time based on packet travel time and packet latency requirement according to embodiments of the invention.

As shown in FIG. 6A, for a high priority downlink packet, the queuing time $T_Q$ satisfies the following condition:

$$T_Q+T_D \leq L_D, \quad (3)$$

where the queuing time $T_Q=T_{TX}-T_G$, $T_G$ is the time the packet is generated, $T_{TX}$ is the time the packet transmitted, $T_D$ is the travel time for the downlink packet, and $L_D$ is the latency requirement for the downlink packet.

Figure 6B:
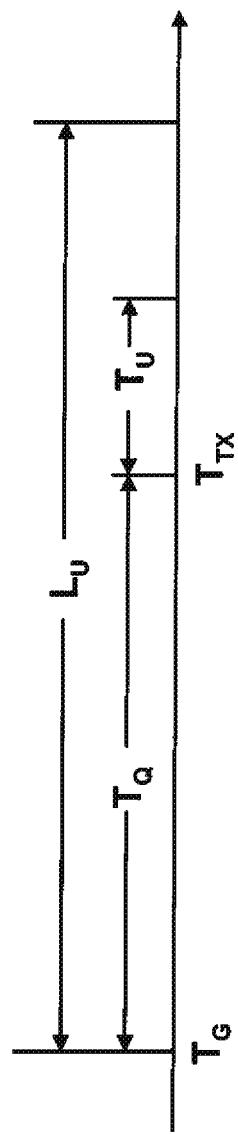
FIG. 6B is a schematic of an uplink packet queuing time based on the packet travel time and the packet latency requirement according to embodiments of the invention.

Similarly, as shown in FIG. 6B for a high priority uplink packet, the queuing time $T_Q$ satisfies the following condition:

$$T_Q+T_U<=L_U, \quad (4)$$

where queuing time $T_Q$ is same as in Eqn. (3), $T_U$ is the travel time needed by the uplink packet, and $L_U$ is the latency requirement for the uplink packet.

The maximum queuing time $T_{QM}$ for the downlink packet is $$T_{QM}=L_D-T_D,$$

and the maximum queuing time $T_{QM}$ for the uplink packet is $$T_{QM}=L_U-T_U.$$

If $T_Q \leq T_{QM}$, then the packet is that is transmitted satisfies its latency requirement. However, if $T_Q > T_{QM}$, then transmission of the packet does not meet the latency requirement.

Schedule Multiple Packets for Transmission

Given the DDI or UDI, the controller or the mobile nodes determine the number of packets that can be transmitted. For the controller, scheduling depends on $T_{DDI}$, the number of packets in the downlink transmission queue, the queuing time, priority, the latency requirement and the travel time of each downlink data packet. For the mobile nodes, the scheduling depends on $T_{UDI}$, the number of packets in the uplink transmission queue, the queuing time, the priority, the latency requirement, and the travel time of each uplink data packet.

As described in U.S. Ser. No. 12/964,283, to avoid latency due to feedback, no packet acknowledgement is used. Therefore, the number of packets to be transmitted within a data interval can be determined. Assume the controller transmits $K_j$ packets from category $C_j$ (j=1, 2, . . . , n), then the following condition is satisfied:

$$K_1 * T_{C1}+K_2 * T_{C2}+\ldots+K_n * T_{Cn}<=T_{DDI} \quad (5)$$

A similar inequality also holds for mobile nodes.

It is not necessary that packets are transmitted in the queuing order. For example, with the same queuing time, a higher priority packet is transmitted before a lower priority packet. With the same priority, a packet with longer queuing time is transmitted before a packet with a shorter queuing time. In case of bandwidth shortage, lower priority packets yield to higher priority packets. Thus, the latency requirement for higher priority packet is guaranteed.

Figure 7:
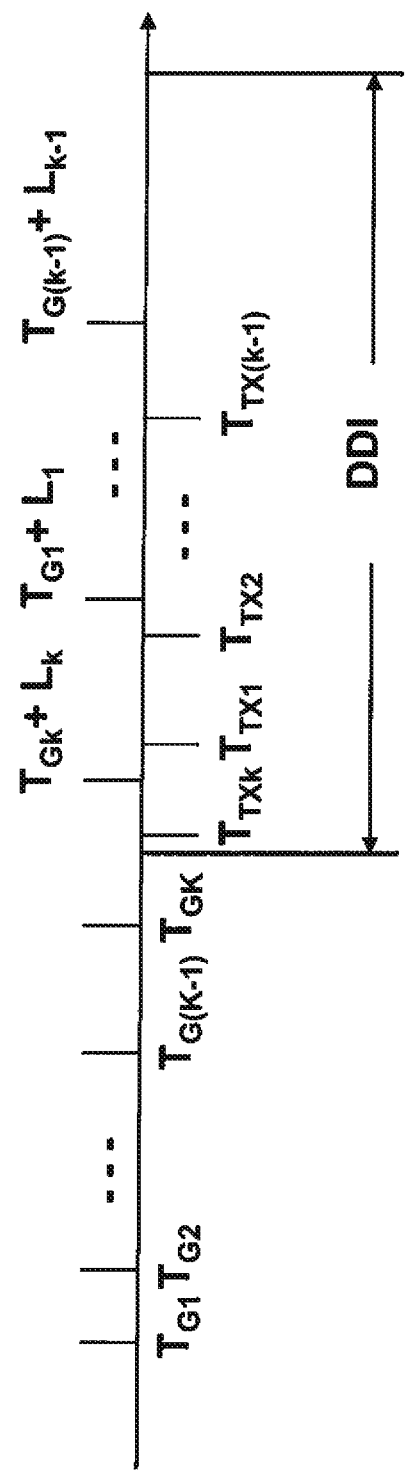
FIG. 7 is a schematic of scheduling multiple downlink data packets for transmission within a downlink data interval.

FIG. 7 shows a scheduling example, in which there are k downlink packets in the transmission queue to be transmitted in the next DDI. All k packets have same the priority. Packets are generated such that $T_{G1}<T_{G2}<\ldots<T_{G(k-1)}<T_{Gk}$. That is, $T_{Q1}>T_{Q2}>\ldots>T_{Q(k-1)}>T_{Qk}$. However, the k-th packet has a shorter latency, such that $T_{Gk}+L_k<T_{G1}+L_1<\ldots<T_{G(k-1)}+L_{k-1}$, where $L_1, L_2, \ldots, L_k$ are the respective latency requirements for k packets. Therefore, the transmission times $T_{TX1}, T_{TX2}, \ldots, T_{TXk}$ are scheduled as $T_{TXk}<T_{TX1}<\ldots<T_{TX(k-1)}$. That is, the k-th packet is transmitted first.

The controller and the mobile nodes can select the number of packets from different categories to optimize the usage of bandwidth as long as the latency requirement is satisfied.

The controller and the mobile nodes guarantee that their scheduled packet transmissions can be completed within the given data interval. The controller and the mobile nodes also guarantee that their packet transmission can be completely received by destination within scheduled receiving time interval for the destination. In other words, transmission of the last packet in the DDI or the UDI is not too close to the end of the DDI or the UDI. For the controller, the starting transmission time $T^L_{TX}$ of the last downlink packet with respect to beginning of the DDI satisfies:

$$T^L_{TX} <= T_{DDI} + T^1_{CH} + T^1_{HF} - T^L_D, \quad (6)$$

where $T^1_{CH}$ and $T^1_{HF}$ are for the first downlink packet of the DDI as defined in Eqn. (1), and $T^L_D$ is travel time of the last downlink packet.

For the mobile nodes, the starting transmission time $T^L_{TX}$ of the last uplink packet with respect to the beginning of the UDI satisfies:

$$T^L_{TX} <= T_{UDI} + T^{C1}_{MF} - T^L_U, \quad (7)$$

where $T^{C1}_{MF}$ is defined in Eqn. (2) for a category $C_1$ packet, $T^L_U$ is the travel time of the last uplink packet with the relay starting from terminal node. In other words, the mobile nodes determine a latest transmission time for a last uplink packet transmitted in the UDI.

Uplink Packet Relay

All the fixed nodes that successfully receive an uplink packet from the mobile node relay the received packet to the head node via wired network. However, the fixed node that receives the relayed packet from a previous node checks the packet ID to determine if the same packet has already been forwarded to the next node. If yes, the node drops packet, otherwise, the packet is relayed to the next node.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

We claim:

1. A method for scheduling downlink packets to be transmitted in a hybrid communication network for a transportation safety system, wherein the hybrid communication network includes a wired network and a wireless network, wherein the wired network includes a set of fixed nodes, wherein the set of fixed nodes includes a head node at a first end of the wired network connected to a controller via a wired interface, a terminal node at a second end of the wired network, and a set of relay nodes arranged between the head node and the terminal node, wherein the wireless network includes a set of mobile nodes, wherein each mobile node is arranged in a moveable car associated with the transportation safety system, wherein the controller includes means for generating the downlink packets and transmitting the downlink packets to the head node via the wired interface, wherein the downlink packet are asynchronously relayed to the set of relay nodes and the terminal node via the wired network, wherein all the fixed nodes synchronously retransmit the downlink packets via the wireless network to the set of mobile nodes after the terminal node receives the downlink packet, and wherein the set of fixed nodes are arranged sequentially along a trajectory of the moveable cars, comprising: determining a downlink travel time for the downlink packets to travel from the controller to the set of fixed nodes and from the set of fixed nodes to the set of mobile nodes, wherein a downlink travel time $T_D$ for the downlink packet from the controller to a mobile node $MN_i$ is $T_D = T_{CH} + T_{HF} + T_{FM}$, where $T_{CH}$ is a time from when the controller be ins transmitting the downlink packet to a time a head node ($FN_0$) has received the downlink packet, $T_{HF}$ is a time from when the head node has received the downlink packet to a time when all the fixed nodes begin transmitting the packet synchronously, and $T_{FM}$ is a time from when all the fixed nodes synchronously transmit the packet to a time when the mobile node $MN_i$ has received the packet; scheduling downlink data intervals (DDI) based on the downlink travel time; and transmitting the downlink packets to the set of mobile nodes during the DDI, such that a latency requirement of the transportation system is satisfied.

2. The method of claim 1, wherein the DDI have a fixed length.

3. The method of claim 1, wherein the DDI have variable lengths.

4. The method of claim 1, wherein multiple downlink packets are transmitted during the DDI.

5. The method of claim 1, wherein the scheduling is fixed.

6. The method of claim 1, wherein the scheduling is dynamic.

7. The method of claim 1, further comprising:
terminating the transmitting of the downlink packets before an end of the DDI.

8. The method of claim 1, where the controller and the set of fixed nodes have dedicated downlink channels.

9. The method of claim 4, wherein the controller stores the downlink packets in a transmission queue, and further comprising:
determining a queuing time for the downlink packets, such that the latency requirement is satisfied.

10. The method of claim 9, wherein the scheduling is based on a length of the DDI, a length of the downlink packets, a number of the downlink packets in the transmission queue, the queuing time, a priority of the downlink packets, the latency requirement and the downlink travel time of each downlink packet.

11. The method of claim 1, further comprising:
determining a latest transmission time for a last downlink packet transmitted in the DDI.

12. The method for claim 1, wherein the set of mobile nodes generate uplink packets, and further comprising:
determining an uplink travel time for the uplink packets to travel from the set of mobile nodes to the set of fixed nodes and from the set of fixed nodes to the controller;
scheduling uplink data intervals (UDI) based on the uplink travel time; and
transmitting the uplink packets during the UDI, such that the latency requirement is satisfied.

13. The method of claim 12, wherein the UDI have a fixed length.

14. The method of claim 12, wherein the UDI have variable lengths.

15. The method of claim 12, wherein multiple uplink packets are transmitted during the UDI.

16. The method of claim 12, wherein the scheduling of the UDI is fixed.

17. The method of claim 12, wherein the scheduling of the UDI is dynamic.

18. The method of claim 1, further comprising:
    terminating the transmitting of the uplink packets before an end of the UDI.

19. The method of claim 12, wherein the DDI and the UDI alternate, and there is a free period between each DDI and next UDI for the controller and a free period between each UDI and next DDI for each mobile node.

20. The method of claim 1, wherein the set of mobile nodes operate asynchronously.

21. The method of claim 12, further comprising:
    determining a latest transmission time for a last uplink packet transmitted in the UDI.

* * * * *